United States Patent
He et al.

(10) Patent No.: US 9,906,994 B2
(45) Date of Patent: Feb. 27, 2018

(54) HANDOVER METHOD, MASTER BASE STATION AND SLAVE BASE STATION

(71) Applicant: ZTE CORPORATION, Shenzhen, Guangdong Province (CN)

(72) Inventors: Feng He, Shenzhen (CN); Yada Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 8 days.

(21) Appl. No.: 14/910,256

(22) PCT Filed: May 19, 2014

(86) PCT No.: PCT/CN2014/077788
§ 371 (c)(1),
(2) Date: Feb. 5, 2016

(87) PCT Pub. No.: WO2014/177090
PCT Pub. Date: Nov. 6, 2014

(65) Prior Publication Data
US 2016/0192245 A1   Jun. 30, 2016

(30) Foreign Application Priority Data

Aug. 12, 2013  (CN) .......................... 2013 1 0350467

(51) Int. Cl.
*H04W 36/00* (2009.01)
*H04W 36/08* (2009.01)
*H04W 84/04* (2009.01)

(52) U.S. Cl.
CPC ... *H04W 36/0055* (2013.01); *H04W 36/0033* (2013.01); *H04W 36/08* (2013.01); *H04W 84/045* (2013.01); *H04W 36/0005* (2013.01)

(58) Field of Classification Search
CPC ......... H04W 36/0005; H04W 36/0011; H04W 36/0016; H04W 36/0033; H04W 36/0055;
(Continued)

(56) References Cited

U.S. PATENT DOCUMENTS

| 2013/0170474 A1 | 7/2013 | Bi et al. |
| 2014/0004863 A1* | 1/2014 | Zhang ............... H04W 36/0033 455/444 |

FOREIGN PATENT DOCUMENTS

WO    2015138069 A1    9/2015

OTHER PUBLICATIONS

3GPP TR 36.8; Technical Specification Group Radio Access Network; Evolved Universal Terrestrial Radio Access (E-UTRA); Study on Small Cell Enhancements for E-UTRA and E-UTRAN.
(Continued)

*Primary Examiner* — Khoa Huynh
(74) *Attorney, Agent, or Firm* — Ling Wu; Stephen Yang; Ling and Yang Intellectual Property

(57) ABSTRACT

Disclosed are a handover method, a master evolved NodeB (MeNB) and a secondary evolved NodeB (SeNB), wherein, the method is applied to perform a handover on a MeNB for a user equipment (UE) in a multi-connection scenario in which the UE has connections with both a master evolved NodeB (MeNB) and a secondary evolved NodeB (SeNB), including: a source MeNB initiating a handover, and sending a handover command to the UE after receiving a corresponding response, instructing the UE to perform the handover on the MeNB via the handover command, and remaining a connection with the SeNB; after the UE successfully accesses a destination MeNB, the source MeNB or the destination MeNB sending a handover instruction message to the SeNB connected with the UE, the SeNB connected
(Continued)

with the UE establishing an association with the destination MeNB according to the handover instruction message.

15 Claims, 6 Drawing Sheets

(58) Field of Classification Search
CPC ......... H04W 36/0061; H04W 36/0066; H04W 36/08; H04W 84/045
See application file for complete search history.

(56) References Cited

OTHER PUBLICATIONS

Analysis on the Solutions for the Prioritized Scenarios of MeNB Handover;ZTE Corporation;3GPP TSG-RAN3 Meeting #83; Prague, Czech Republic, Feb. 10-14, 2014; R3-140053.

Small cell operation under macro coverage; NEC Group; 3GPP TSG Ran WG1 Meeting #72; St Julian's, Malta, Jan. 28-Feb. 1, 2013; R1-130373.

* cited by examiner

HANDOVER METHOD, MASTER BASE STATION AND SLAVE BASE STATION

TECHNICAL FIELD

The present document relates to the long term evolution system, and more particularly, to a handover method, a master evolved NodeB and a secondary evolved NodeB.

BACKGROUND OF THE INVENTION

With constant evolution of wireless communication technologies and standards, mobile packet services have been developed tremendously, and data throughput capacity of a single terminal is constantly upgrading. Take the Long Term Evolution (referred to as LTE) system as an example, a maximum downlink data transmission rate of 100 Mbps is supported in 20 M bandwidth, and in the subsequent LTE Advanced network, the data transmission rate will be further increased, even up to 1 Gbps.

The related LTE user plane data protocol stack is shown in FIG. 1, the downlink data received by an evolved nodeB (Evolved eNB) from the core network through the GPRS Tunneling Protocol for the user plane (referred to as GTP-U) is unpackaged and then sent to the User Equipment (abbreviated to UE) after processed by the packet data convergence protocol (referred to as PDCP) sub-layer, the Radio Link Control (referred to as RLC) protocol sub-layer, the media access control (MAC) protocol sub-layer and the physical (PHY) layer; the uplink data transmission is exactly opposite to the downlink one.

Currently, the data transmission link between the network side and the UE is a one-to-one dedicated link, therefore the signal quality and the size of the used resource of this link determines the data transmission performance between the network side and the UE. If the resource used by the link is restricted or the signal quality is relatively poor, the user experience of the UE will fall down, which is a great challenge now faced by mobile operators, although the network capacity extends year by year, it still cannot keep up with the increasing number of user terminals and the increasing user demand on data traffic.

In order to meet the growing demand on data traffic as well as the geographically uneven characteristics of the traffic, the operators add Low Power Nodes (LPNs), Small Cells or Pico eNBs to increase hotspots in the process of deploying the new generation of communication network (such as the LTE). With the increasing number of LPN cells, the network deployment environment becomes more complex, meanwhile it also brings some problems.

First, because the coverage of an LPN cell is much smaller compared to a Macro Cell, the capacity is relatively small, some LPN cells could easily be occupied by users, leading to the high load, thus affecting the user data throughput, while some other LPN cells or macro cells are at a relatively low level of load. In order to balance the load, the network side needs to perform load balancing operation, but this process is not flexible enough, especially when the number of cells is relatively large, this uneven load becomes more serious because of a lack of flexibility.

In addition, because the number of LPN cells is relatively large, when the user equipment, also called user terminal, moves within the network, it will lead to frequent inter-cell handovers, and causes frequent data service interruption or even call dropped, which causes user data throughput and user experience fall down. At the same time, this frequent handover results in the terminal and the network, especially the core network, receiving an impact of a large number of signaling, which may lead to a congestion and even paralysis of system resources.

With the increasing number of LPN cells deployed by operators and individuals in the future, the abovementioned situation becomes increasingly serious, therefore nowadays many companies and operators are inclined to looking for new enhancing schemes, and Dual Connectivity is one of them. Terminals in the dual connectivity can simultaneously remain connected with two network nodes (or more than two, the dual connectivity as described herein is just a general term and does not limit the number of connections), shown in FIG. 2, wherein the master node is called master eNB (MeNB, generally refer to a macro evolved NodeB node) or master base station, while other nodes are called Secondary eNB (SeNB, generally refer to micro evolved NodeB or low-power node) or secondary base station, and for example, the UE remains connected with the macro cell and the LPN cell at the same time, when the network load is not balanced, the network side can adjust the amount of data transmitted by the terminal in the MeNB and SeNB nodes in real time, and at the same time, if the SeNB cell changes because the UE moves or due to other reasons, the other cell can still stay connected, and this change will not lead to excessive signaling impacts.

There are many traffic offloading methods between the MeNB and the SeNB, the offloading anchor point may be placed in the serving gateway (S-GW), as shown in FIG. 3 (A); or may be placed in the MeNB, if it is placed in the MeNB, it may also continue refining the traffic offloading collaboration between different layers depending on their different specific traffic offloading layers, such as traffic offloading in the PDCP layer, traffic offloading in the PDCP layer, etc., as shown in FIG. 3 (B), FIG. 3 (C), FIG. 3 (D), and FIG. 3 (E).

The abovementioned dual connection method has been enhanced for frequent changes of the SeNB, but when the MeNB changes, the migration of all UE related context, including part of the configuration information carried in the SeNB, cannot be achieved in the dual connection handover in accordance with conventional handover methods. The MeNB has to first get back the connection bearer in the SeNB, convert it to a single connection, and then the new MeNB reselects a SeNB to offload the traffic after the MeNB handover completes. This will increase the probability of issues such as data traffic interruptions and dropped calls, therefore, it still needs to be further optimized.

SUMMARY OF THE INVENTION

To solve the technical problem, the present document is to provide a handover method, a master evolved NodeB and a secondary evolved NodeB to achieve the handover of the master evolved NodeB for a UE under the condition of avoiding data traffic interruptions and dropped calls when the UE is in a multi-connection scenario.

To solve the abovementioned technical problem, a handover method of the present document is applied to perform a handover of a master evolved NodeB (MeNB) for a user equipment (UE) in a multi-connection scenario in which the UE is connected with both a master evolved NodeB (MeNB) and a secondary evolved NodeB (SeNB), comprising:

a source MeNB initiating a handover, and sending a handover command to the UE after receiving a corresponding response, instructing the UE to perform a handover on the MeNB through the handover command, and remaining a connection with a SeNB;

after the UE successfully accesses a destination MeNB, the source MeNB or the destination MeNB sending a handover instruction message to the SeNB connected with the UE, the SeNB connected with the UE establishing an association with the destination MeNB according to the handover instruction message.

Preferably, the method further comprises:

the source MeNB initiating a handover, comprising: the source MeNB sending a handover request message or a handover requirement message, carrying bearer information on the SeNB connected with the UE and context configuration information of a bearer on the SeNB in the message;

after receiving the bearer information on the SeNB connected with the UE and the context configuration information of the bearer on the SeNB, the destination MeNB performing acceptance admission control according to the bearer information on the SeNB connected with the UE, and saving the context configuration information of the bearer on the SeNB.

Preferably, the method further comprises:

the source MeNB further carrying identification information of the SeNB connected with the UE in the handover request message or the handover requirement message transmitted by the source MeNB;

when the destination MeNB sends the handover instruction message to the SeNB connected with the UE, the destination MeNB sending the handover instruction message to the SeNB connected with the UE according to the identification information of the SeNB connected with the UE.

Preferably, the SeNB connected with the UE establishing an association with the destination MeNB according to the handover instruction message comprises:

the SeNB connected with the UE confirming that control plane management of the UE switches to the destination MeNB according to identification information of the UE carried in the handover instruction message.

Preferably, in the case that a traffic offloading anchor point between the destination MeNB and the SeNB connected with the UE is a destination MeNB, the method further comprises:

the source MeNB or the destination MeNB sending a handover instruction message to the SeNB connected with the UE comprising: carrying port information of a traffic offloading tunnel between the destination MeNB and the SeNB connected with the UE in the handover instruction message;

the SeNB connected with the UE establishing an association with the destination MeNB according to the handover instruction message further comprising: the SeNB connected with the UE establishing a traffic offloading tunnel with the destination MeNB according to the port information of the traffic offloading tunnel.

Preferably, in the case that the traffic offloading anchor point between the destination MeNB and the SeNB connected with the UE is the destination MeNB and a protocol layer of the destination MeNB is a traffic offloading layer, the method further comprises:

the source MeNB or the destination MeNB sending a handover instruction message to the SeNB connected with the UE comprising: carrying the context configuration information of the bearer on the destination MeNB into the handover instruction message.

A master evolved NodeB, comprising: a handover request unit, wherein:

the handover request unit is configured to: initiate a handover, send a handover command to a user equipment (UE) after receiving a corresponding response, and instruct the UE to perform a handover on the MeNB via the handover command, and remain a connection with a secondary evolved NodeB (SeNB).

Preferably, the handover request unit is configured to: initiate a handover, comprising: sending a handover request message or a handover requirement message, and carrying bearer information on the secondary evolved NodeB (SeNB) connected with the UE and context configuration information of a bearer on the SeNB in the message.

A master evolved NodeB, comprising: a handover unit, wherein:

the handover unit is configured to, after a user equipment (UE) successfully accesses, send a handover instruction message to a secondary evolved NodeB (SeNB) connected with the UE, and instruct the SeNB connected with the UE to establish an association with a destination master evolved NodeB (MeNB) according to the handover instruction message.

Preferably, the handover instruction message carries identification information of the UE;

the handover unit is further configured to: in the case that a traffic offloading anchor point between the destination MeNB and the SeNB connected with the UE is a destination MeNB, carry port information of a traffic offloading tunnel between the destination MeNB and the SeNB connected with the UE in the handover instruction message;

Preferably, the handover unit is further configured to: in the case that the traffic offloading anchor point between the destination MeNB and the SeNB connected with the UE is the destination MeNB and a protocol layer of the destination MeNB is a traffic offloading layer, carry context configuration information of a bearer on the destination MeNB into the handover instruction message.

Preferably, the master control evolved NodeB further comprises an accepting unit and a context configuration processing unit, wherein:

the accepting unit is configured to: before the UE accesses successfully, after receiving bearer information on the SeNB connected with the UE, perform acceptance admission control according to the bearer information on the SeNB connected with the UE;

the context configuration processing unit is configured to: after receiving the context configuration information of the bearer on the SeNB, save the context configuration information of the bearer on the SeNB. A secondary evolved NodeB, comprising: a receiving unit and an association establishing unit, wherein:

the receiving unit is configured to: receive a handover instruction message;

the association establishing unit is configured to: after the receiving unit receives the handover instruction message, establish an association with the destination evolved NodeB (MeNB) according to the handover instruction message.

Preferably, the association establishing unit is configured to: establishing an association with the destination MeNB according to the handover instruction message comprising: confirming that control plane management of the UE switches to the destination MeNB according to identification information of the UE carried in the handover instruction message.

Preferably, the association establishing unit is configured to: establishing an association with the destination MeNB according to the handover instruction message further comprising: in the case that a traffic offloading anchor point between the destination MeNB and the SeNB is a destination MeNB, establishing a traffic offloading tunnel with the destination MeNB according to the port information of the traffic offloading tunnel carried in the handover instruction message, and in the case that the traffic distribution anchor point between the destination MeNB and the SeNB is the destination MeNB, and a protocol layer of the destination MeNB is a traffic offloading layer, save context configuration information of a bearer on the destination MeNB carried in the handover instruction message.

In summary, the embodiment of the present document can optimize and enhance the handover performance in an actual networking because the macro cell changes. During the handover process, it can ensure that part of user plane data will not be interrupted, meanwhile, it also saves signaling overhead at the air interface and ensures the backward compatibility of the protocol to the maximum extent.

PREFERRED EMBODIMENTS OF THE INVENTION

Figure 4:
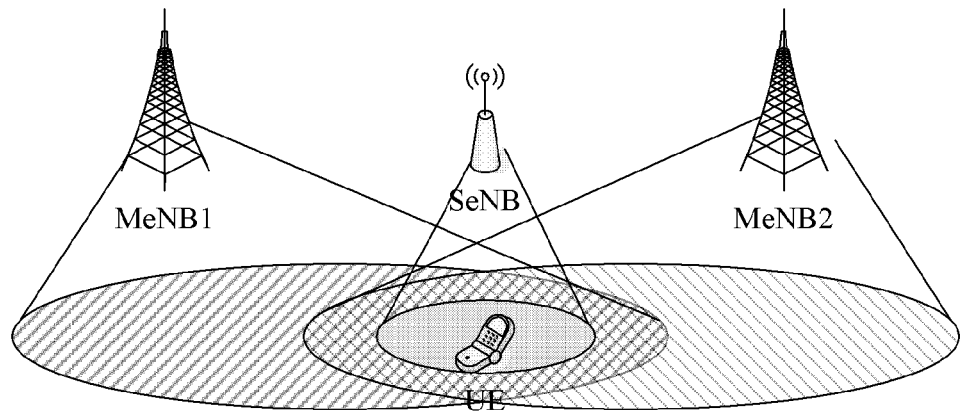
FIG. 4 is a schematic diagram of a specific implementation scenario in accordance with an embodiment of the present application.

As shown in FIG. 4, when the SeNB is located the coverage overlapped area of two MeNBs, if the UE is connected with the MeNB1 and the SeNB, at this time, because the UE moves, it needs to perform a handover from the MeNB1 to the MeNB2, then the control plane signaling and all the context information of the UE will be transferred to the MeNB2. When taking into account that the UE needs to perform the handover from the MeNB1 to the MeNB2 in this application, because the UE does not moves out the coverage of the SeNB, it can keep connected with the SeNB during the handover, then the connection of the UE on the SeNB will not be affected. In order to ensure the normal subsequent traffic offloading and interaction between the SeNB and the MeNB2, after the handover completes, the MeNB 1 or the MeNB2 needs to send a handover instruction message to the SeNB. That is: when the UE executing a dual-connection perform a handover on the MeNB, the connection on the SeNB in the coverage overlapped area of the source MeNB and the destination MeNB may be remained, and the SeNB reestablishes an association with the destination MeNB after the handover is completed.

In the present application, the source MeNB initiates a handover, and sends a handover command to the UE after receiving a corresponding response, instructs the UE to perform a handover on the MeNB via the handover command, and keep connected with the SeNB; after the UE successfully accesses to the destination MeNB, the source MeNB or the destination MeNB sends a handover instruction message to the SeNB connected with the UE, and instructs the SeNB connected with the UE that the handover from the source MeNB to the destination MeNB for the UE has performed, and the SeNB connected with the UE establishes an association with the destination MeNB according to the handover instruction message.

In the present application, for the X2 handover, the source MeNB sends the destination MeNB a handover request message carrying bearer information on the SeNB connected with the UE, identification information of the SeNB, and context configuration information of a bearer on the SeNB, and it also carries bearer information on the source MeNB when there is a bearer on the source MeNB; the destination MeNB sends a handover command and optional data forwarding information to the source MeNB, and the source MeNB sends a handover command to the UE, wherein the command instructs the UE only perform the handover on the MeNB; after the destination MeNB confirms that the UE successfully switches to the destination MeNB, the destination MeNB sends a path switch message to the core network to complete the path switch of the user plane, and also sends a handover instruction message to the SeNB, finally the SeNB sends a response message to the destination MeNB, and an association between the SeNB and the destination MeNB is established.

The destination UE sends a handover instruction message to the SeNB connected with the MeNB, wherein the handover instruction message carries the identification information of the UE allocated by the destination MeNB to the UE to instruct the SeNB that the control plane management of the UE has switched to the destination MeNB;

in the case that the traffic offloading anchor point between the destination MeNB and the SeNB connected with the UE is the destination MeNB and the protocol layer of the destination MeNB is the traffic offloading layer, the handover instruction message may also carry the context configuration information of the bearer on the destination MeNB; the destination MeNB sends the context configuration information of the bearer on the MeNB to the SeNB, so that the SeNB can obtain the configuration information of the traffic offloading layer as well as the configuration information of the layer above the traffic offloading layer on the MeNB, when the SeNB needs to send uplink data, the SeNB correctly sends data packets according to the configuration information of the traffic offloading layer and the configuration information of the layer above the traffic offloading layer on the MeNB, thus avoiding the case that the bearer in the destination MeNB changes compared to the source MeNB after the UE switches to the destination MeNB, while the SeNB cannot obtain the configuration information of the traffic offloading layer and the layer above the traffic offloading layer on the destination MeNB, so that the traffic offloading layer and the layer above the traffic offloading layer cannot process the data packets sent by the SeNB, and the data packets of the SeNB cannot be sent properly.

In the case that the traffic offloading anchor point between the destination MeNB and the SeNB connected with the UE is the destination MeNB, the handover instruction message may also carry port information of the traffic offloading tunnel between the destination MeNB and the SeNB to establish the traffic offloading tunnel between the SeNB and the destination MeNB.

The SeNB establishing an association with the destination MeNB refers to that the SeNB confirms that the control plane management of the UE has switched to the destination MeNB according to the identification information of the UE in the handover instruction message, and the destination MeNB manages the SeNB to continue to execute the offloading transmission. Meanwhile, when the traffic distribution anchor point between the destination MeNB and the SeNB connected with the UE is the destination MeNB, namely the SeNB is offloaded from the destination MeNB, the association further comprises that the SeNB connected with the UE establishes a traffic offloading tunnel with the destination MeNB according to port information of the traffic offloading tunnel.

In the following, the present application will be described further in combination of different embodiments.

The First Embodiment

Figure 5:
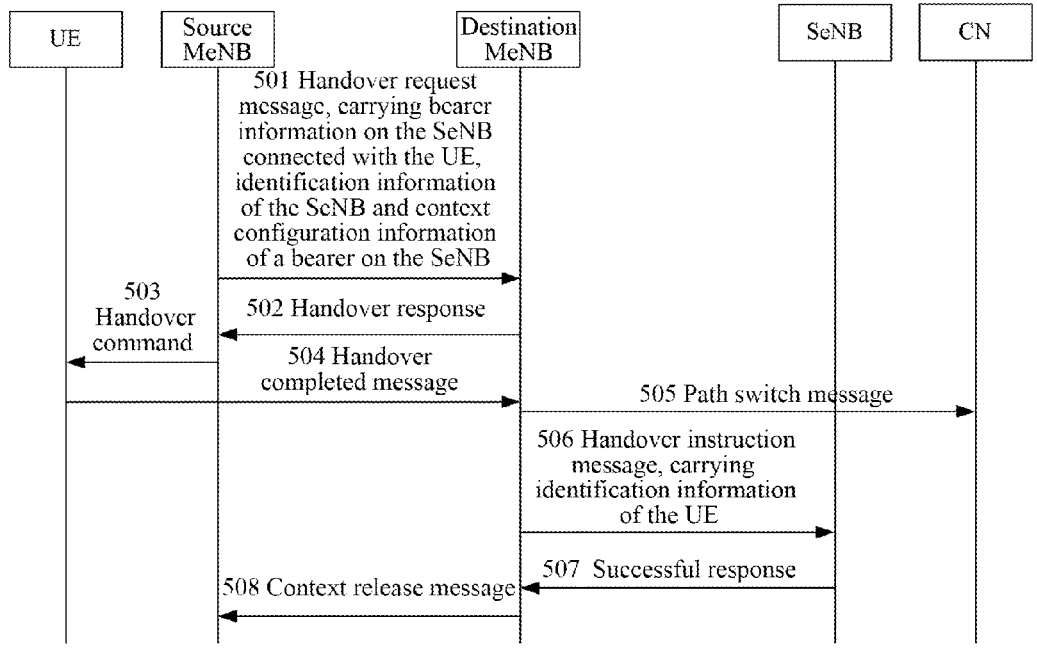
FIG. 5 is a flow chart of a first embodiment in accordance with an embodiment of the present application.

Take the serving gateway (S-GW) as a traffic offloading anchor pointed for example, the bearer user plane of the UE on the MeNB and the SeNB is directly connected to the S-GW, as shown in FIG. 3 (A). The source MeNB initiates a handover to the destination MeNB, shown in FIG. 5, comprising the following steps.

In step 501: the source MeNB sends the destination MeNB a handover request message carrying the bearer information in the SeNB connected with the UE, the identification information of the SeNB and the context configuration information of the bearer on the SeNB, and also the bearer information on the source MeNB when there is a bearer on the source MeNB;

the bearer information comprises one or more of identification information of the bearer, quality of service (QoS) parameter of the bearer, data forwarding information of the bearer, and port address information of the uplink serving gateway.

For FIG. 3 (A), the context configuration information of the bearer on the SeNB comprises radio resource control (RRC) configuration information, layer 2 (including PDCP, RLC and MAC) configuration information, physical layer configuration information, security capability information and security key information corresponding to the bearer.

In step 502: after the destination MeNB receives the handover request message, it performs acceptance admission control according to the bearer information, and processes context configuration information of the bearer according to the context configuration information of the bearer on the SeNB, wherein, in order to guarantee being consistent with the bearer configuration in the SeNB, the destination MeNB needs to save the context configuration information of the bearer on the SeNB in the request message, and sends a handover response to the source MeNB after it saves successfully, wherein the response carries a handover command and data forwarding information;

the data forwarding information refers to port information of the forwarding tunnel established in order to execute the data forwarding between the source MeNB and the destination MeNB.

In step 503: after the source MeNB receives the handover response, it establishes a data forwarding tunnel with the destination MeNB, and performs data forwarding, meanwhile the source MeNB sends the handover command to the UE, and instructs the UE only perform the handover on the MeNB via the handover command, and remains connected with the SeNB.

In step 504: after receiving the handover command, the UE synchronizes with the destination MeNB and sends a handover completed message to the destination MeNB. In step 505: after the destination MeNB confirms that the UE accesses successful, it sends a path switch message to the core network to indicate the core network to switch the S1-interface bearer to the destination MeNB.

In step 506: meanwhile the destination MeNB sends a handover instruction message to the SeNB according to the identification information of the SeNB, and the message carries the identification information of the UE allocated by the destination MeNB to the UE for instructing the SeNB that the control plane management of the UE has switched to the destination MeNB;

In step 507: the SeNB updates the locally stored UE context according to the instruction, and sends a successful response to the destination MeNB to complete the association between the SeNB and the destination MeNB.

In step 508: the destination MeNB sends a context released message to the source MeNB to instruct the source MeNB that the handover is successful and the appropriate resources can be released.

The above process takes the X2 handover between the MeNBs for example, in the event that it is the S1 handover in practice, the abovementioned principle still applies, except that the transmitted message name and path are different.

The orders of steps 505, 506 and 507, 508 can be adjusted arbitrarily, and specifically decided based on the implementation.

The abovementioned handover instruction message sent to the SeNB may also be sent by the source MeNB.

The Second Embodiment

Figure 6:
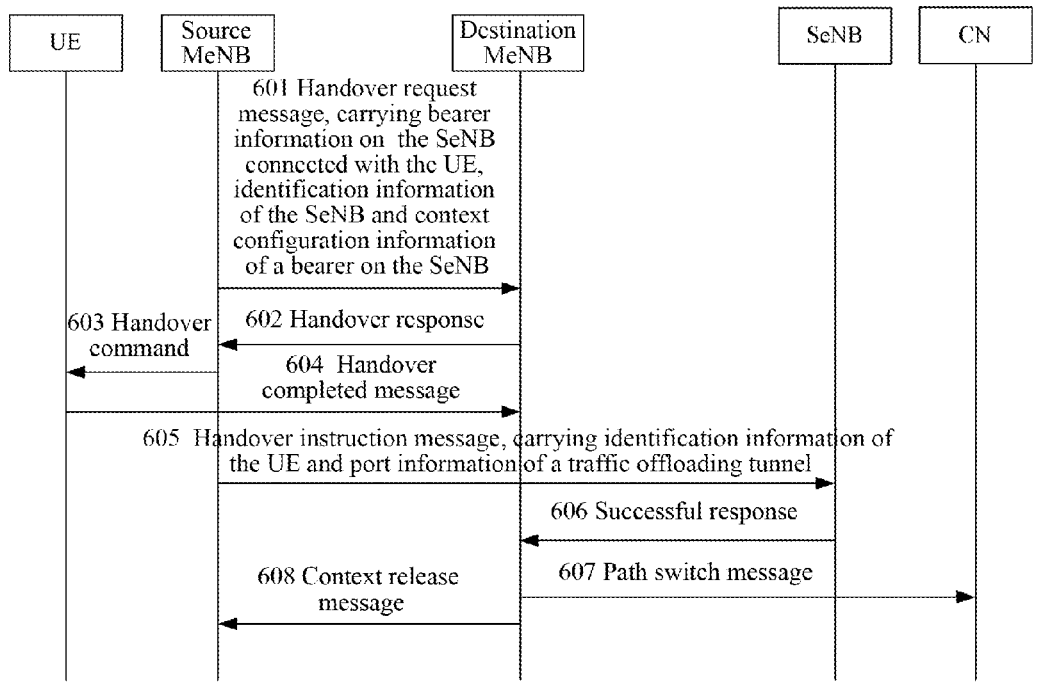
FIG. 6 is a flow chart of a second embodiment in accordance with an embodiment of the present application.

Take the MeNB as the traffic offloading anchor point for example, wherein the data is offloaded above the PDCP layer, and respectively sent to the MeNB and the SeNB to transmit, as shown in FIG. 3 (B). The source MeNB initiates a handover to the destination MeNB, as shown in FIG. 6, comprising the following steps.

Figure 1:
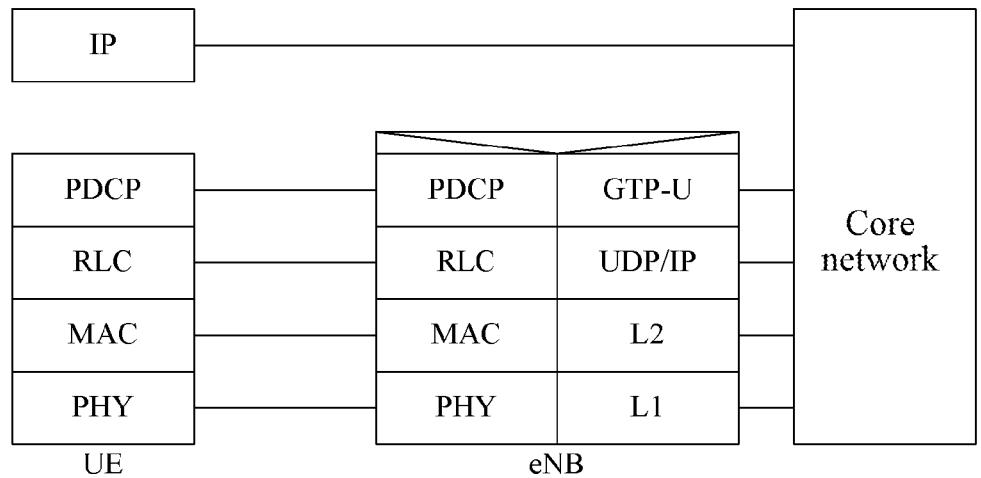
FIG. 1 is a schematic diagram of a LTE user plane protocol stack in the related art.
Figure 2:
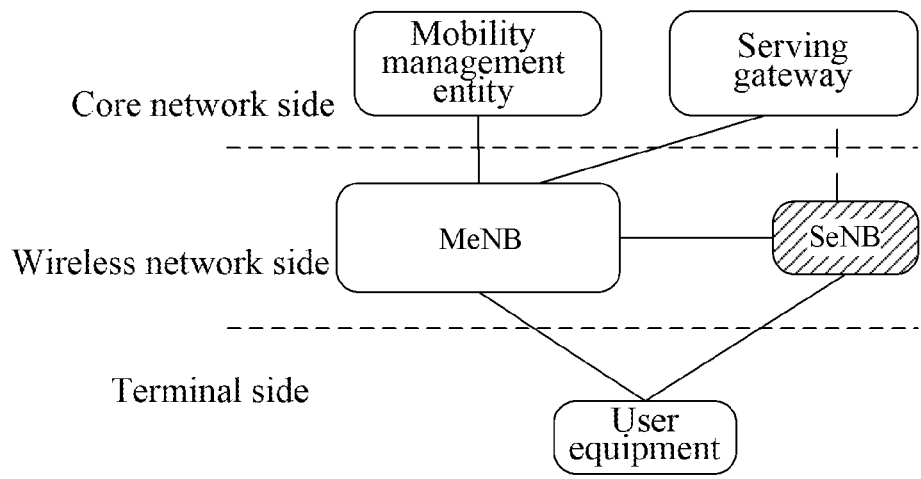
FIG. 2 is a schematic diagram of a data multi-stream transmission architecture in the related art.
Figure 3A:
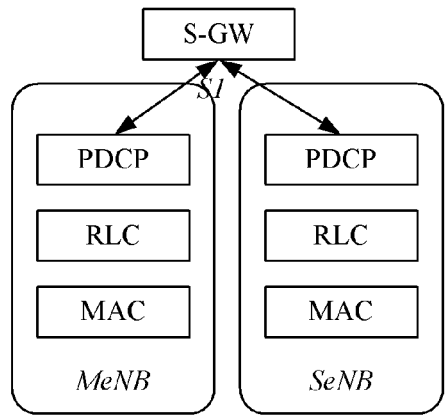
FIG. 3 (A)~FIG. 3 (E) are schematic diagrams of a data offloading protocol stack in the related art.
Figure 3B:
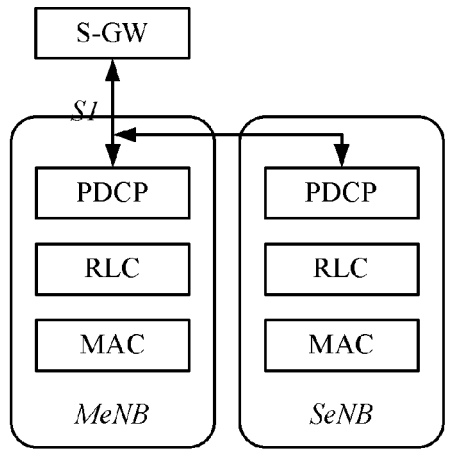
Figure 3C:
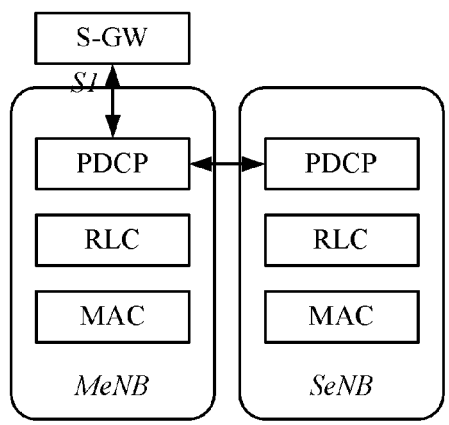
Figure 3D:
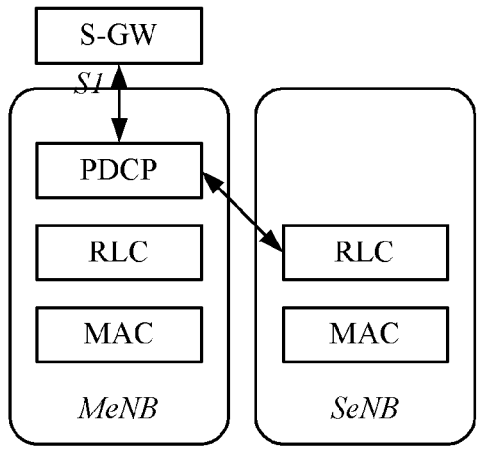
Figure 3E:
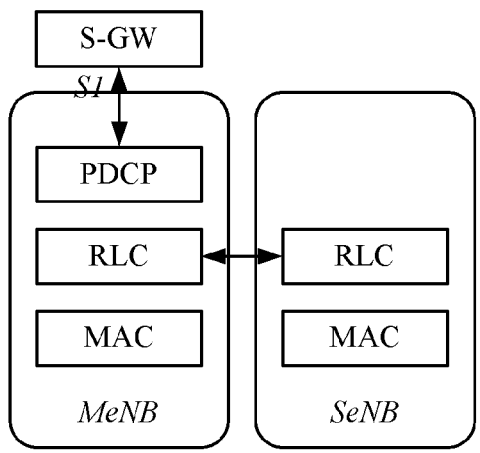

In step 601: the source MeNB sends the destination MeNB a handover request message carrying the bearer information on the SeNB connected with the UE, the identification information of the SeNB and the context configuration information of the bearer on the SeNB;

In step 602: after the destination MeNB receives the handover request message, it performs acceptance admission control and processes context configuration information of the bearer, wherein, in order to guarantee to be consistent with the bearer configuration on the SeNB, the destination MeNB needs to save the context configuration information of the bearer on the SeNB in the request message, after saving successfully, sends a handover response to the source MeNB, and the response carries a handover command, data forwarding information, and traffic offloading tunnel information and identification information of the UE allocated by the destination MeNB to the UE;

for FIG. 3(B), the context configuration information of the bearer on the SeNB comprises radio resource control (RRC) configuration information, layer 2 (including PDCP, RLC and MAC) configuration information, physical layer configuration information, security capability information and security key information corresponding to the bearer.

In step 603: after the source MeNB receives a handover response, it establishes a data forwarding tunnel with the destination MeNB and performs data forwarding, meanwhile the source MeNB sends a handover command to the UE, and instructs the UE only perform the MeNB handover via the handover command, and keep connected with the SeNB.

In step 604: after receiving the handover command, the UE is synchronized with the destination MeNB and sends a handover completed message to the destination MeNB.

In step 605: meanwhile, the source MeNB sends a handover instruction message to the SeNB, and the message carries identification information of the UE allocated by the destination MeNB to the UE in order to instruct the SeNB that the control plane management of the UE has switched to the destination MeNB and also carries the port information of the traffic offloading tunnel.

In step 606: after receiving the handover instruction message, the SeNB confirms that the control plane management of the UE has switched to the destination MeNB, establishes a traffic offloading tunnel with the destination MeNB according to the port information of the traffic offloading tunnel, and completes the traffic offloading of the destination MeNB to the SeNB, after the SeNB successfully establishes the traffic offloading tunnel, the SeNB sends a successful response to the destination MeNB and completes the association with the destination MeNB.

In step 607: meanwhile the destination MeNB sends a path switch message to the core network to instruct the core network to switch the S1 interface bearer to the destination MeNB;

In step 608: the destination MeNB sends a context release message to the source MeNB to instruct the source MeNB that the handover is successful and the appropriate resources can be released.

The abovementioned process takes the X2 handover between the MeNBs for example, in the event that it is the S1 switch in practice, the abovementioned principle still applies, except that the transmitted message name and path are different.

The orders of steps 605, 606 and 607, 608 can be adjusted arbitrarily, and specifically decided based on the implementation.

The abovementioned handover instruction message sent to the SeNB may also be sent by the destination MeNB.

The Third Embodiment

Figure 7:
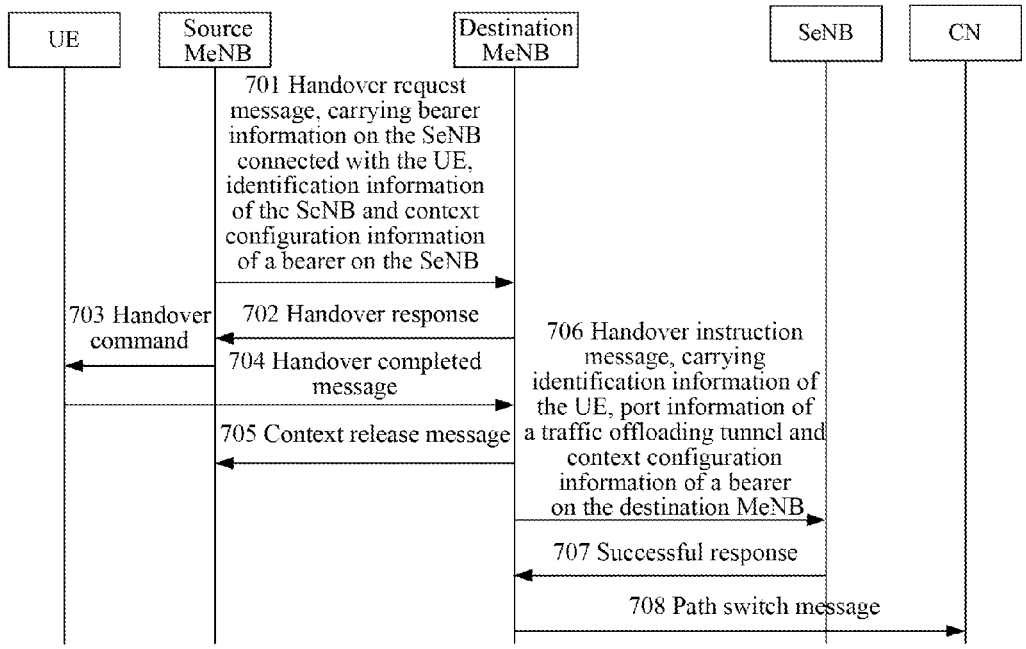
FIG. 7 is a flow chart of a third embodiment in accordance with an embodiment of the present application.

Take the MeNB as the traffic offloading anchor point for example, wherein the data is offloaded between the PDCP layer and the RLC layer, and respectively sent to the MeNB and the SeNB to transmit, as shown in FIG. 3 (D). The source MeNB initiates a handover to the destination MeNB, as shown in FIG. 7, comprising the following steps In step 701: the source MeNB sends the destination MeNB a handover request message carrying the bearer information on the SeNB connected with the UE, the identification information of the SeNB and the context configuration information of the bearer on the SeNB, and also carries the bearer information on the source MeNB when there is a bearer in the source MeNB, and may also carry the downlink data forwarding instruction;

for FIG. 3 (D), the context configuration information of the bearer on the SeNB comprises radio resource control (RRC) configuration information and layer 2 (including PDCP, RLC and MAC) configuration information corresponding to the bearer.

In step 702: after receiving the handover request message, the destination MeNB performs acceptance admission control and processes context configuration information of the bearer, wherein, in order to guarantee to be consistent with the bearer configuration on the SeNB, the destination MeNB needs to save the context configuration information of the bearer on the SeNB in the request message, and after saving successfully, sends a handover response to the source MeNB, wherein the response carries a handover command and data forwarding information.

In step 703: After receiving the handover response, the source MeNB establishes a data forwarding tunnel with the destination MeNB and performs data forwarding, meanwhile, the source MeNB sends a handover command to the UE, and instructs the UE only execute the MeNB handover via the handover command, and keeps connected with the SeNB.

In step 704: after receiving the handover, the UE is synchronized with the destination MeNB and sends a handover completed message to the destination MeNB.

In step 705: after confirming that the UE accesses successfully, the destination MeNB sends a context release message to the source MeNB to instruct the source MeNB that the handover is successful and the corresponding resources can be released.

In step 706: meanwhile, the destination MeNB sends a handover instruction message to the SeNB according to the identification information of the SeNB, wherein the message carries the identification information of the UE allocated by the destination MeNB to the UE in order to instruct the SeNB connected with the UE that the control plane management of the UE has switched to the destination MeNB and also carries the port information of the traffic offloading tunnel and the context configuration information of the bearer on the destination MeNB;

the context configuration information of the bearer on the destination MeNB is such as the identification newly allocated by the destination MeNB to the UE. The destination MeNB sends the context configuration information of the bearer on the MeNB to the SeNB so that the SeNB can obtain the configuration information of the traffic offloading layer, as well as the configuration information of the layer above the traffic offloading layer on the MeNB, when the SeNB needs to send the uplink data, it can correctly send the data packets according to the configuration information of the traffic offloading layer as well as the configuration information of the layer above the traffic offloading layer in the MeNB, thus avoiding the case that the bearer in the destination MeNB changes compared to the source MeNB after the UE switches to the destination MeNB, while the SeNB cannot obtain the configuration information of the traffic offloading layer and the configuration information of the layer above the traffic offloading layer on the destination MeNB, so that the traffic offloading layer and the layer above the traffic offloading layer cannot process data packets sent by the SeNB, and the data packets of the SeNB cannot be sent properly.

As shown in FIG. 3 (C), the traffic offloading layer of the MeNB is the PDCP layer of the MeNB, the destination MeNB sends the context configuration information of the bearer on the MeNB to the SeNB, so that the SeNB can obtain configuration information of the PDCP layer on the MeNB, because the uplink data of the SeNB needs to be processed by the PDCP layer of the MeNB, in order to make the SeNB normally send the uplink data, it needs to make the SeNB know the configuration information of the PDCP layer of the MeNB.

As shown in FIG. 3 (D), the traffic offloading layer of the MeNB is the PDCP layer of the MeNB, the destination MeNB sends the context configuration information of the bearer in the MeNB to the SeNB, so that the SeNB can obtain configuration information of the PDCP layer of the MeNB.

As shown in FIG. 3 (E), the traffic offloading layer of the MeNB is the RLC layer of the MeNB, the layer above the traffic distribution layer is the PDCP layer, the destination MeNB sends the context configuration information of the bearer on the MeNB to the SeNB, so that the SeNB can obtain the configuration information of the PDCP layer and the RLC layer of the MeNB.

In step 707: after receiving the handover instruction message, the SeNB confirms that the control plane management of the UE has switched to the destination MeNB according to the identification information of the UE carried in the handover instruction message, and establishes a traffic offloading tunnel with the destination MeNB according to the port information of the traffic offloading tunnel, and completes the traffic offloading of the destination MeNB to the SeNB, and updates the locally stored corresponding context configuration according to the context configuration information of the bearer in the destination MeNB, completes the association between the SeNB and the destination MeNB, and sends a successful response to the destination MeNB and completes the association between the SeNB and the destination MeNB.

In step 708: the destination MeNB sends a path switch message to the core network to instruct the core network to switch the S1 interface bearer to the destination MeNB;

The abovementioned process takes the X2 handover between the MeNBs for example, in the event that it is the S1 switch in practice, the abovementioned principle still applies, except that the message name and path are different.

The orders of steps 705, 706 and 707, 708 can be adjusted arbitrarily, and specifically decided based on the implementation.

The abovementioned handover instruction message sent to the SeNB may also be sent by the source MeNB.

The Fourth Embodiment

Figure 8:
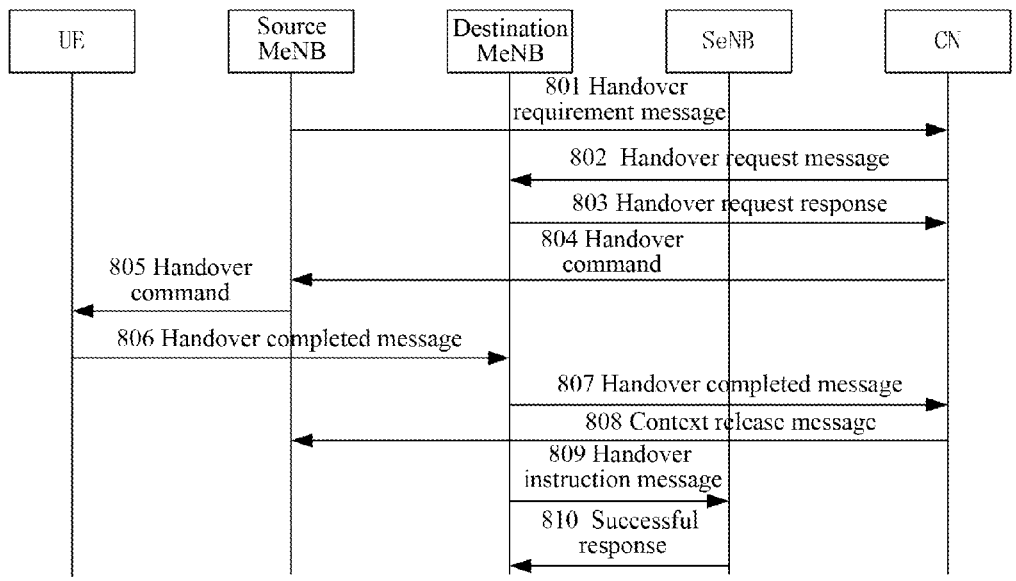
FIG. 8 is a flow chart of a fourth embodiment in accordance with an embodiment of the present application.

Take the MeNB as the traffic offloading anchor point for example, wherein the data is offloading within the RLC layer, the RLC entities of the MeNB and the SeNB are respectively the master RLC and the secondary RLC, and the data is sent to the SeNB via the master RLC to transmit, as shown in FIG. 3 (E). The source MeNB initiates a handover to the destination MeNB, as shown in FIG. 8, comprising the following steps.

In step 801: the source MeNB sends the core network a handover requirement message carrying the bearer information on the SeNB connected with the UE, identification information of the SeNB and the context configuration information of the bearer on the SeNB, and also carrying the bearer information on the source MeNB when there is a bearer in the source MeNB;

the context configuration information of the bearer on the SeNB comprises the original configuration of the protocol at the SeNB side, as shown in FIG. 3 (E), the context configuration information of the bearer on the SeNB comprises the RRC configuration information, the RLC configuration information and the MAC configuration information.

In step 802: the core network sends a handover request message to the destination MeNB after receiving the handover requirement message. In step 803: after receiving the handover request message, the destination MeNB performs acceptance admission control and processes context configuration information of the bearer according to the context configuration information of the bearer on the SeNB, wherein, in order to guarantee to be consistent with the bearer configuration in the SeNB, the destination MeNB needs to save the context configuration information of the bearer on the SeNB in the request message, and after saving successfully, sends a handover request response to the core network, and the response carries a handover command and data forwarding information.

In step 804: After receiving a handover request response, the core network sends a handover response to the source MeNB, and the response carries the handover command and the data forwarding information;

In step 805: after receiving a handover response, the source MeNB establishes a data forwarding tunnel with the destination MeNB and performs data forwarding, meanwhile the source MeNB sends the handover command to the UE, and instructs the UE only execute the MeNB handover via the handover command, and stays connected with the SeNB.

In step 806: after receiving the handover command, the UE is synchronized with the destination MeNB and sends a handover completed message to the destination MeNB.

In step 807: after the destination MeNB confirms that the UE accesses successfully, it sends a handover completed message to the core network;

In step 808: the core network sends a context release message to the source MeNB to instruct the source MeNB that the handover is successful and the appropriate resources can be released.

In step 809: meanwhile, the destination MeNB sends a handover instruction message to the SeNB according to the identification information of the SeNB, and the message carries the identification information allocated by the destination MeNB to the UE in order to instruct the SeNB connected with the UE that the control plane management of the UE has switched to the destination MeNB and also carries the port information of the traffic offloading tunnel and the context configuration information of the bearer on the destination MeNB.

In step 810: the SeNB updates the locally stored context configuration according to the instruction, and establishes a traffic offloading tunnel with the destination MeNB according to the port information of the traffic offloading tunnel to complete the traffic offloading of the destination MeNB to the SeNB, and sends a successful response to the destination MeNB, and completes the association between the SeNB and the destination MeNB.

The abovementioned process takes the S1 handover between the MeNBs for example, in the event that it is the X2 handover in practice, the abovementioned principle still applies, except that the message name and path are different.

The abovementioned handover instruction message sent to the SeNB may also be sent by the source MeNB.

The present application further provides a master evolved NodeB, comprising: a handover request unit, wherein:

the handover request unit is configured to initiate a handover, send a handover command to the user equipment (UE) after receiving a corresponding response, and instruct the UE to switch the MeNB via the handover command, and stay connected with a secondary evolved NodeB (SeNB).

The handover request unit initiating a handover comprises: sending a handover request message or a handover requirement message, wherein the message carries the bearer information on the SeNB connected with the UE and the context configuration information of the bearer on the SeNB.

Figure 9:
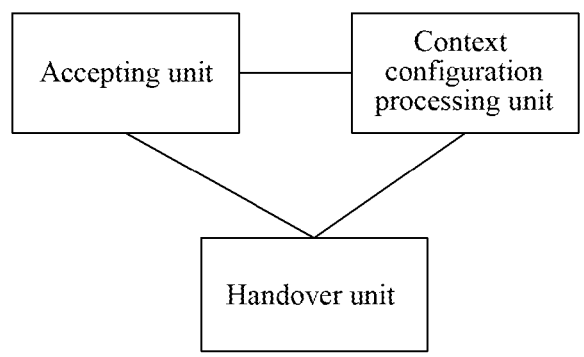
FIG. 9 is an architectural diagram of a master evolved NodeB in accordance with an embodiment of the present application.

As shown in FIG. 9, the present application provides another master evolved NodeB, comprising: a handover unit, wherein:

the handover unit is configured to, after the user equipment (UE) successfully accesses, send a handover instruction message to the secondary evolved NodeB (SeNB) connected with the UE, and instruct the SeNB connected with the UE to establish an association with the destination master evolved NodeB (MeNB) according to the handover instruction message.

The handover instruction message carries identification information of the UE;

the handover unit is further configured to: in the case that a traffic offloading anchor point between the destination MeNB and the SeNB connected with the UE is a destination MeNB, carry port information of the traffic offloading tunnel between the destination MeNB and the SeNB connected with the UE into the handover instruction message;

the handover unit is further configured to: in the case that the traffic offloading anchor point between the destination MeNB and the SeNB connected with the UE is the destination MeNB and the protocol layer of the destination MeNB is the traffic offloading layer, carry the context configuration information of the bearer on the destination MeNB into the handover instruction message.

Preferably, the master evolved NodeB further comprises an accepting unit and a context configuration processing unit, wherein:

the accepting unit is configured to: before the UE successfully accesses, after receiving the bearer information in the SeNB connected with the UE, perform acceptance admission control according to the bearer information on the SeNB connected with the UE;

the context configuration processing unit is configured to: after receiving the context configuration information of the bearer on the SeNB, store the context configuration information of the bearer on the SeNB.

Figure 10:
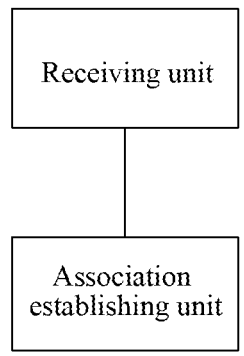
FIG. 10 is an architectural diagram of a secondary evolved NodeB in accordance with an embodiment of the present application.

As shown in FIG. 10, the present application further provides a secondary evolved NodeB, comprising: a receiving unit and an association establishment unit, wherein:

the receiving unit is configured to receive a handover instruction message;

the association establishing unit is configured to: after the receiving unit receives the handover instruction message, establish an association with the destination master evolved NodeB (MeNB) according to the handover instruction message.

The association establishing unit establishing an association with the destination MeNB based on the handover instruction message comprises: according to identification information of the UE carried in the handover instruction message, confirming that the control plane management of the UE has switched to the destination MeNB.

The association establishing unit establishing an association with the destination MeNB according to the handover instruction message further comprises: in the case that a traffic offloading anchor point between the destination MeNB and the SeNB is the destination MeNB, establishing a traffic offloading tunnel with the destination MeNB according to the port information of the traffic offloading tunnel carried in the handover instruction message, and in the case that the traffic offloading anchor point between the destination MeNB and the SeNB is the destination MeNB and the protocol layer of the destination MeNB is the traffic offloading layer, storing the context configuration information of the bearer on the destination MeNB carried into the handover instruction message.

Those ordinarily skilled in the art can understand that all or some of steps of the abovementioned method may be completed by the programs instructing the relevant hardware, and the abovementioned programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

Of course, the present document may have a variety of other embodiments, and without departing from the spirit and the substance of the present document, those skilled in the art can make all appropriate changes and modifications in accordance with the present document, and these appropriate changes and modifications should fall within the protection scope of the appended claims of the present document.

INDUSTRIAL APPLICABILITY

The embodiment of the present document can optimize and enhance the handover performance in an actual networking because the macro cell changes. During the handover process, it can ensure that part of user plane data will not be interrupted, meanwhile, it also saves signaling overhead at the air interface and ensures the backward compatibility of the protocol to the maximum extent.

What is claimed is:

1. A handover method, applied to perform a handover of a master evolved NodeB (MeNB) for a user equipment (UE) in a multi-connection scenario in which the UE is connected with both the MeNB and a secondary evolved NodeB (SeNB), comprising:

a source MeNB initiating a handover, sending a handover command to the UE after receiving a corresponding response, instructing the UE to perform a handover on the MeNB through the handover command, and remaining a connection with the SeNB;

after the UE successfully accesses a destination MeNB, the source MeNB or the destination MeNB sending a handover instruction message to the SeNB connected with the UE, the SeNB connected with the UE establishing an association with the destination MeNB according to the handover instruction message;

wherein, in the case that a traffic offloading anchor point between the destination MeNB and the SeNB connected with the UE is the destination MeNB, the method further comprises: the source MeNB or the destination MeNB sending to the SeNB connected with the UE the handover instruction message which carries port information of a traffic offloading tunnel between the destination MeNB and the SeNB connected with the UE;

the SeNB connected with the UE establishing an association with the destination MeNB according to the handover instruction message further comprising: the SeNB connected with the UE establishing the traffic offloading tunnel with the destination MeNB according to the port information of the traffic offloading tunnel.

2. The method of claim 1, wherein, the method further comprises:
the source MeNB initiating a handover, comprising: the source MeNB sending a handover request message or a handover requirement message to the destination MeNB, carrying in the message bearer information in the SeNB connected with the UE and context configuration information of a bearer in the SeNB;
after receiving the bearer information in the SeNB connected with the UE and the context configuration information of the bearer in the SeNB, the destination MeNB performing acceptance admission control according to the bearer information in the SeNB connected with the UE, and saving the context configuration information of the bearer in the SeNB.

3. The method of claim 2, wherein, the method further comprises:
the source MeNB further carrying identification information of the SeNB connected with the UE in the handover request message or handover requirement message transmitted by the source MeNB;
when the destination MeNB sends the handover instruction message to the SeNB connected with the UE, the destination MeNB sending the handover instruction message to the SeNB connected with the UE according to the identification information of the SeNB connected with the UE.

4. The method of claim 1, wherein, the SeNB connected with the UE establishing an association with the destination MeNB according to the handover instruction message comprises:
the SeNB connected with the UE confirming that control plane management of the UE has switched to the destination MeNB according to identification information of the UE carried in the handover instruction message.

5. The method of claim 1, wherein, in the case that the traffic offloading anchor point between the destination MeNB and the SeNB connected with the UE is the destination MeNB and a protocol layer of the destination MeNB acts as a traffic offloading layer, the method further comprises:
the source MeNB or the destination MeNB sending a handover instruction message to the SeNB connected with the UE comprising: carrying context configuration information of a bearer in the destination MeNB into the handover instruction message.

6. A non-transitory computer readable storage medium, storing programs that when executed by a master evolved NodeB (MeNB) which is applied to perform a handover of the MeNB for a user equipment (UE) in a multi-connection scenario in which the UE is connected with both the MeNB and a secondary evolved NodeB (SeNB), cause the MeNB to carry out the following steps:
initiating a handover, sending a handover command to the UE after receiving a corresponding response, instructing the UE to perform a handover on the MeNB via the handover command, and remaining a connection with the SeNB; and
after the UE successfully accesses a destination MeNB, sending a handover instruction message to the SeNB connected with the UE to instruct the SeNB connected with the UE to establish an association with the destination MeNB according to the handover instruction message;
wherein sending a handover instruction message to the SeNB connected with the UE to instruct the SeNB connected with the UE to establish an association with the destination MeNB according to the handover instruction message is implemented by following ways:
in the case that a traffic offloading anchor point between the destination MeNB and the SeNB connected with the UE is the destination MeNB, sending to the SeNB connected with the UE the handover instruction message which carries port information of a traffic offloading tunnel between the destination MeNB and the SeNB connected with the UE, to instruct the SeNB connected with the UE to establish the traffic offloading tunnel with the destination MeNB according to the port information of the traffic offloading tunnel.

7. The non-transitory computer readable storage medium of claim 6, wherein, initiating the handover is implemented by the following way: sending a handover request message or a handover requirement message to the destination MeNB, and carrying in the message bearer information in the SeNB connected with the UE and context configuration information of a bearer in the SeNB.

8. A non-transitory computer readable storage medium, storing programs that when executed by a master evolved NodeB (MeNB) which is applied to perform a handover of the MeNB for a user equipment (UE) in a multi-connection scenario in which the UE is connected with both the MeNB and a secondary evolved NodeB (SeNB), cause the MeNB to carry out the following steps:
after the UE successfully accesses the MeNB acting as a destination MeNB, sending a handover instruction message to the SeNB connected with the UE, and instructing the SeNB connected with the UE to establish an association with the MeNB according to the handover instruction message; and
in the case that a traffic offloading anchor point between the destination MeNB and the SeNB connected with the UE is the destination MeNB, carrying port information of a traffic offloading tunnel between the destination MeNB and the SeNB connected with the UE in the handover instruction message, and instructing the SeNB connected with the UE to establish the traffic offloading tunnel with the destination MeNB according to the port information of the traffic offloading tunnel.

9. The non-transitory computer readable storage medium of claim 8, wherein, the handover instruction message carries identification information of the UE.

10. The non-transitory computer readable storage medium of claim 8, further storing programs that when executed by the MeNB, cause the MeNB carry out the following step: in the case that the traffic offloading anchor point between the destination MeNB and the SeNB connected with the UE is the destination MeNB and a protocol layer of the destination MeNB acts as a traffic offloading layer, carrying context configuration information of a bearer in the destination MeNB into the handover instruction message.

11. The non-transitory computer readable storage medium of claim 8, further storing programs that when executed by the MeNB, cause the MeNB carry out the following steps:
receiving from a source MeNB a handover request message or a handover requirement message carrying bearer information in the SeNB connected with the UE and context configuration information of a bearer in the SeNB;
after receiving the bearer information in the SeNB connected with the UE, performing acceptance admission control according to the bearer information in the SeNB connected with the UE;

after receiving the context configuration information of the bearer in the SeNB, saving the context configuration information of the bearer in the SeNB.

12. The non-transitory computer readable storage medium of claim 11, further storing programs that when executed by the SeNB, cause the SeNB to carry out the following steps: receiving from the source MeNB the handover request message or the handover requirement message further carrying identification information of the SeNB connected with the UE; and sending the handover instruction message to the SeNB connected with the UE according to the identification information of the SeNB connected with the UE.

13. A non-transitory computer readable storage medium, storing programs that when executed by a secondary evolved NodeB (SeNB) which is connected with a user equipment (UE) in a multi-connection scenario, cause the SeNB to carry out the following steps:

receiving a handover instruction message from a source master evolved NodeB (MeNB) or a destination MeNB;

after the handover instruction message is received, establishing an association with the destination MeNB according to the handover instruction message;

in the case that a traffic offloading anchor point between the destination MeNB and the SeNB connected with the UE is the destination MeNB, receiving the handover instruction message carrying port information of a traffic offloading tunnel between the destination MeNB and the SeNB connected with the UE, and establishing the traffic offloading tunnel with the destination MeNB according to the port information of the traffic offloading tunnel.

14. The non-transitory computer readable storage medium of claim 13, wherein, establishing the association with the destination MeNB according to the handover instruction message is implemented by the following way: confirming that control plane management of the UE has switched to the destination MeNB according to identification information of the UE carried in the handover instruction message.

15. The non-transitory computer readable storage medium of claim 14, further storing programs that when executed by the SeNB, cause the SeNB to carry out the following steps: in the case that the traffic offloading anchor point between the destination MeNB and the SeNB is the destination MeNB and a protocol layer of the destination MeNB acts as a traffic offloading layer, saving context configuration information of a bearer in the destination MeNB carried in the handover instruction message.

* * * * *